United States Patent
Fujimoto

(10) Patent No.: US 7,805,242 B2
(45) Date of Patent: Sep. 28, 2010

(54) DRIVING ASSISTANCE SYSTEM

(75) Inventor: Hidetoshi Fujimoto, Anjo (JP)

(73) Assignee: DENSO CORPORATION, Kariya (JP)

( * ) Notice: Subject to any disclaimer, the term of this patent is extended or adjusted under 35 U.S.C. 154(b) by 897 days.

(21) Appl. No.: 11/700,934

(22) Filed: Feb. 1, 2007

(65) Prior Publication Data

US 2007/0299606 A1 Dec. 27, 2007

(30) Foreign Application Priority Data

Feb. 24, 2006 (JP) ............................. 2006-048467

(51) Int. Cl.
*G01C 21/00* (2006.01)
(52) U.S. Cl. ........................................ 701/208; 701/36
(58) Field of Classification Search ........................ None
See application file for complete search history.

(56) References Cited

U.S. PATENT DOCUMENTS

| | | | |
|---|---|---|---|
| 6,035,400 A | 3/2000 | Yasuoka | |
| 6,415,226 B1 * | 7/2002 | Kozak | .......................... 701/210 |
| 6,662,105 B1 | 12/2003 | Tada et al. | |
| 6,760,652 B2 | 7/2004 | Ogasawara | |
| 2002/0080617 A1 | 6/2002 | Niwa et al. | |
| 2002/0080618 A1* | 6/2002 | Kobayashi et al. | ........... 362/466 |
| 2002/0161513 A1 | 10/2002 | Bechtolsheim et al. | |
| 2003/0200259 A1 | 10/2003 | Tsuge | |
| 2005/0169000 A1* | 8/2005 | Hasegawa | .................... 362/466 |
| 2005/0283699 A1 | 12/2005 | Nomura et al. | |
| 2006/0028832 A1* | 2/2006 | Horii et al. | .................... 362/514 |

FOREIGN PATENT DOCUMENTS

| | | |
|---|---|---|
| DE | 101 01 982 | 7/2002 |
| DE | 10 2004 010 197 | 9/2005 |
| JP | A-05-080697 | 4/1993 |
| JP | A-6-265364 | 9/1994 |
| JP | A-11-211491 | 8/1999 |
| JP | 11-321441 | * 11/1999 |
| JP | A-2005-147713 | 6/2005 |

OTHER PUBLICATIONS

Office Action dated Dec. 18, 2008 in corresponding Australian patent application No. 2006 213977.
Office Action dated Jun. 15, 2009 from the German Patent Office in the corresponding German patent application No. 10 2007 003 147.7-54 (and English translation).

* cited by examiner

*Primary Examiner*—Michael J. Zanelli
(74) *Attorney, Agent, or Firm*—Posz Law Group, PLC

(57) ABSTRACT

A control circuit detects a current position of a subject vehicle on a map. Before executing a driving assistance application, the control circuit computes a map reliability degree by using a positioning accuracy coefficient, a time-based change coefficient, and an information accuracy coefficient. The positioning accuracy coefficient indicates a positioning accuracy of map data with respect to a target spot. The time-based change coefficient indicates a time-based change of the map data from the latest investigation for the target spot. The information accuracy coefficient indicates an accordance ratio of the map data relative to actual data with respect to multiple information items related to the target spot. The map data can be used for executing the driving assistance application when the product of (i) a required accuracy designated to the application and (ii) the computed map reliability degree is equal to or more than a predetermined value.

8 Claims, 3 Drawing Sheets

| P. ACCURACY | 0.5m | 2.5m | 10m | 100m |
|---|---|---|---|---|
| | 1 : 500 | 1 : 2,500 | 1 : 10,000 | 1 : 100,000 |
| Rk | 2 | 0.4 | 0.1 | 0.01 |

Rk: MAP RELIABILITY DEGREE

FIG. 3B     $Rk \times Aj$

| Rk / Aj | 2 | 0.4 | 0.1 | 0.01 |
|---|---|---|---|---|
| | 1 : 500 | 1 : 2,500 | 1 : 10,000 | 1 : 100,000 |
| 1 : 500 (0.5m) | 1 | 0.2 | 0.05 | 0.005 |
| 1 : 2,500 (2.5m) | 5 | 1 | 0.25 | 0.025 |
| 1 : 10,000 (10m) | 20 | 4 | 1 | 0.1 |
| 1 : 100,000 (100m) | 200 | 40 | 10 | 1 |

Aj: REQUIRED ACCURACY
Rk: MAP RELIABILITY DEGREE

| Rk \ Aj | 2<br>1 : 500 | 0.4<br>1 : 2,500 | 0.1<br>1 : 10,000 | 0.01<br>1 : 100,000 |
|---|---|---|---|---|
| 0.5m | 1 | 0.2 | 0.05 | 0.005 |
| 2.5m | 5 | 1 | 0.25 | 0.025 |
| 10m | 20 | 4 | 1 | 0.1 |
| 100m | 200 | 40 | 10 | 1 |

Aj: REQUIRED ACCURACY
Rk: MAP RELIABILITY DEGREE

DRIVING ASSISTANCE SYSTEM

CROSS REFERENCE TO RELATED APPLICATION

This application is based on and incorporates herein by reference Japanese Patent Application No. 2006-48467 filed on Feb. 24, 2006.

FIELD OF THE INVENTION

The present invention relates to a driving assistance system to perform a driving assistance application for a control target in a subject vehicle using map data for a map surrounding the subject vehicle.

BACKGROUND OF THE INVENTION

A navigation system mounted in a vehicle detects an absolute position and heading direction of a subject vehicle in a high accuracy using GPS (Global Positioning System) or the like. Based on the position of the vehicle and map data from a map database, the position and heading direction are superimposed on a map displayed on a display unit to thereby achieve a location function. Further, a recommended route to a designated destination is retrieved and indicated to a user to thereby achieve a route guide function.

In the location function, a map matching is used to superimpose the position of the vehicle on a road on the map electronically displayed. In the map matching, a vehicle's track and a road shape in the road map data are compared with each other to estimate a road where the vehicle is running. One method for the map matching can identify not only a road but also a traffic lane along which a vehicle is running (see Patent document 1). Further, a positioning accuracy (i.e., matching ratio) of a map matching is outputted to help prevent mis-recognition of a user (see Patent document 2).

Patent document 1: JP-H11-211491 A
Patent document 2: JP-H6-265364 A

To increase a positioning accuracy in a car navigation system, map data stored in a map database is required to be improved in an accuracy as a whole and to be updated as needed. Providing a highly accurate map for an entire nation (e.g., Japan or the United States of America) involves significant maintenance costs and a possibility of exceeding data capacity for a map data storage medium (HDD, DVD).

Further, detail map data is apt to decrease reliability with time elapsing. Maintaining the reliability of map data requires frequent on-site investigations and frequent map updates. An update may be applied only to a specific segmental region without being applied to any other region. In this case, the user can use detail map data in the specific region, but not in the other region. This may make a user feel strange and make it difficult to use the map data. Thus, map data is typically stored in a map database in an accuracy maintained in an identical level in all regions within the nation.

Further, it is proposed that a vehicle position detected by a navigation system and proximity map data may be used to another driving assistance application in addition to the navigation function. For instance, the application includes a brake control to prevent a collision, a headlight control to follow a road shape such as a curve, and an air-conditioner control to meet a condition in a location. In this case, required accuracy in positioning varies depending on kinds of applications. Very high accuracy may be required to the brake control, while not so high accuracy is required to the air-conditioner control. Therefore, if the positioning accuracy in map data is maintained in an identical level in all regions, a certain driving assistance application may not stably function.

SUMMARY OF THE INVENTION

It is an object of the present invention to provide a driving assistance system to stably perform a driving assistance application using map data (proximity map data) relating to an area surrounding a subject vehicle.

The driving assistance application using map data related to the proximity of the vehicle includes a navigation function, a speed control, a brake control, an alarming in speed or stop, an air-conditioner control, a headlight control, or the like. These applications individually require different accuracy levels in positioning. In the present invention, a map reliability degree is newly defined to indicate a reliability of map data in consideration of not only a positioning accuracy but also other accuracies of related information items.

According to an aspect of the present invention, a driving assistance system for a vehicle is provided as follows. A map storage device is included for storing map data including information items relating to spots including at least one of a facility, a site, and a road. A current position detector is included for detecting a current position of the vehicle using the stored map data. An executing unit is included for executing a driving assistance application for a control target in the vehicle using map data on proximity of the detected current position of the vehicle. A map reliability degree computing unit is included for computing a map reliability degree, which indicates an accuracy of the map data on proximity of the detected current position with respect to an information item relating to a spot included in the proximity. The executing unit executes the driving assistance application based on an operation associated with the computed map reliability degree.

According to another aspect of the present invention, a method for executing a driving assistance application for a control target in a vehicle is provided as follows. The driving assistance application is executed based on map data having information items relating to spots including at least one of a facility, a site, and a road. The method comprises: (i) detecting a current position of the vehicle; (ii) computing a map reliability degree, which indicates an accuracy of map data on proximity of the detected current position of the vehicle with respect to an information item of a spot included in the proximity; and (iii) determining, based on the computed map reliability degree, whether the map data on proximity of the detected current position is allowed to be used for executing the driving assistance application.

BRIEF DESCRIPTION OF THE DRAWINGS

The above and other objects, features, and advantages of the present invention will become more apparent from the following detailed description made with reference to the accompanying drawings. In the drawings:

FIG. 1 is a flowchart diagram illustrating a process for determining whether map data can be used for executing a driving assistance application according to an example of the present invention;

FIGS. 3A and 3B are diagrams illustrating examples of using map data for a map display application;

DETAILED DESCRIPTION OF THE PREFERRED EMBODIMENTS

A driving assistance system 1 will be explained as an example according to the present invention. This system 1 is mounted in a subject vehicle to associate a navigation device with a vehicle control.

Figure 2:
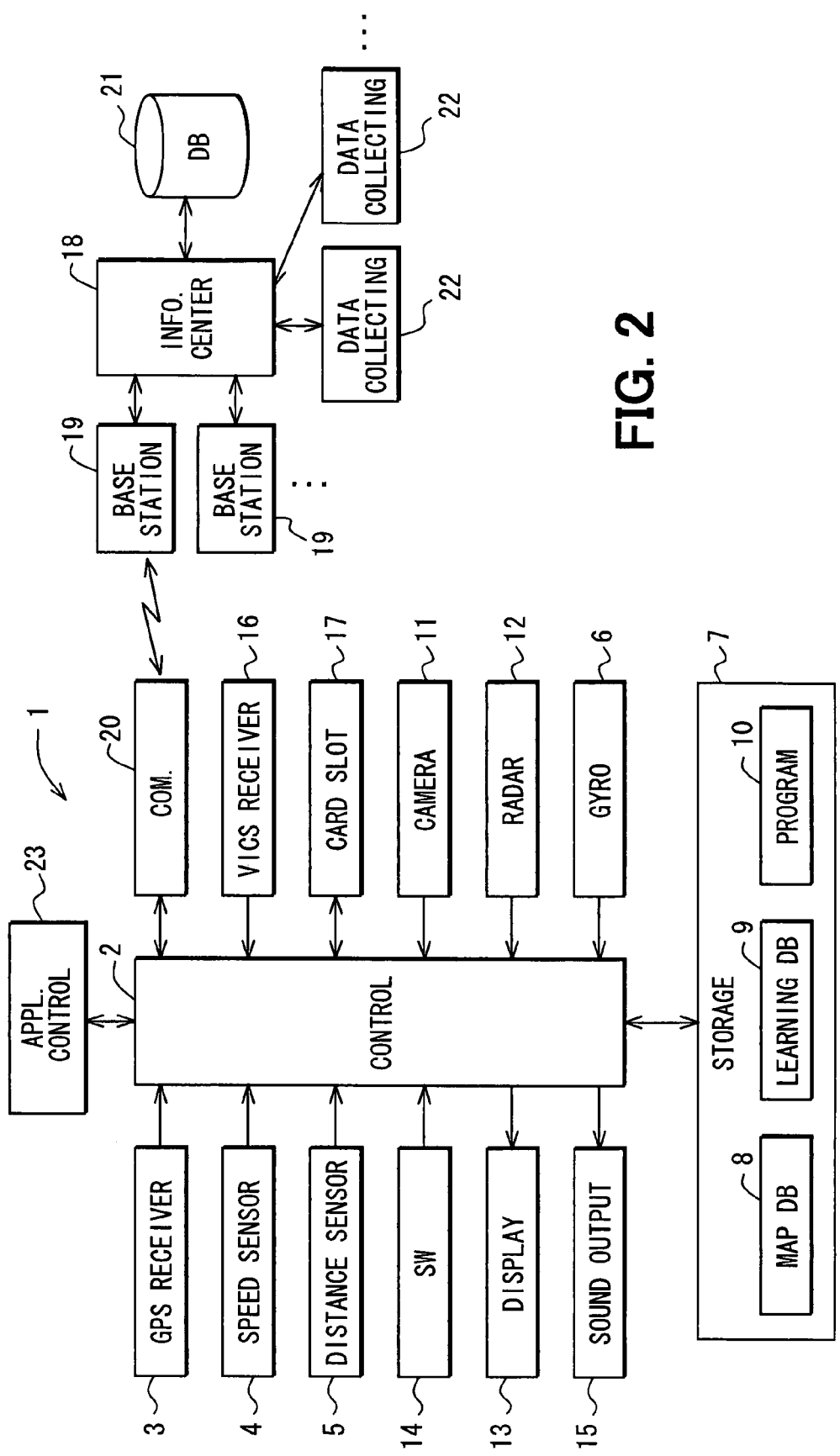
FIG. 2 is a block diagram illustrating an overall structure of a driving assistance system.

As shown in FIG. 2, the system 1 mainly includes a control circuit 2 having a microcomputer with a CPU, ROM, RAM, and I/O. The control circuit 2 is connected with a position detector including a GPS sensor (receiver) 3, a speed sensor 4, a distance sensor 5, and a 3-D gyroscope 6. Signals for detecting a position of the vehicle from the sensors 3 to 6 are inputted to the control circuit 2.

The control circuit 2 is further connected with the storage device 7. This storage device 7 includes a map database 8, a learning database 9, and a program storage unit 10. The control circuit 2 is further connected with a camera 11 for monitoring proximity of the vehicle and a radar 12 for detecting an area forward of the vehicle. The camera 11 and radar 12 function as a proximity information obtaining unit to obtain information on proximity of the vehicle and input it to the control circuit 2.

The control circuit 2 computes a current (absolute) position of the vehicle based on signals from the position detector. The control circuit 2 then detects a relative position on a map, i.e., where the vehicle is running on the map, using a known map matching method based on the detected vehicle position, the information on proximity, and road map data from the map database 8. Thus, a current position detecting function is achieved.

The map database 8 functions as a map data storage device to store map data including (i) road map data covering all the nation (e.g., Japan) and (ii) related facility data. The road map data includes data on roads and spots pertinent to roads. For instance, the spots include points of interest, buildings, facilities, or sites. The data on roads include a shape, kind, distance, width, inclination, and name, with respect to a road. The data on spots include an address, telephone number, site name, and land feature, with respect to a spot. The data on roads further include data for rendering or reproducing road maps in a screen on a display device 13 (to be explained later), and road data (i.e., link data) for retrieving a route.

The facility data include a variety of data indicating (i) transport facilities such stations, (ii) facilities such as leisure facilities, hotels, public offices, and tourist spots, (iii) shops such as convenience stores, department stores, restaurants, and gas stations, and (iv) residential structures such as a residence and condominium. Those data include names, telephone numbers, addresses, coordinates (latitude and longitude), classifications (higher level classification, intermediate level classification, lower level classification), business hours, the number of parking lots, lists of provided services, and credit cards available. Further, the facility data include data for superimposing a landmark of a facility on road maps in the screen.

The map database 8 further include data for computing a map reliability degree pertinent to the above map data. The data for computing a map reliability degree include a positioning accuracy when measurement (on-site investigation) was done, a map scale, a time when an investigation was done (or an elapsed time from the investigation), an investigation entity, a reference source (or information kind), a reference map scale (positioning error), and a map kind.

In this example, the map database 8 includes (i) detail map data having a detail (high) accuracy level with respect to a first region group, i.e., cities, main traffic locations, and (ii) general map data having a usual accuracy level with respect to a second region group, i.e., regions other than the first region group. The map database 8 may includes map data having an identical accuracy level with respect to all regions of the nation. The map data is updated as needed, e.g., once a year.

The control circuit 2 is further connected with (i) an operation switch group 14 for a user to input various instructions, (ii) the display device 13 for displaying navigation windows or various messages, and (iii) a sound output device 15 for an audio guide. The control circuit 2 is further connected with a VICS (Vehicle Information and Communication System) receiver 16, and a card slot 17.

Thus, the above structure can achieve a navigation function to render a map, retrieve a route, or indicate the retrieved route, such as a location function and a route guide function. In the location function, a vehicle current position and a heading direction are superimposed on a map surrounding the vehicle in the screen of the display device 13. In the route guide function, a recommended route to a destination designated by a user is automatically computed and indicated to the user. This navigation function is included in a driving assistance system and performed by the control circuit 2.

The control circuit 2 is further connected with a communication device 20 to wirelessly communicate with an outside information center 18 via an intermediary station 19. The information center 18 includes a database 21 to store map data such as road map data and facility data and further collects latest map data to accumulate it in the database 21 using data collecting terminals 22 provided in all the regions of the nation. The control circuit 2 obtains data for information accuracy from the information center 18 via the communication device 20.

The control circuit 2 is further connected with an application control unit 23. The application control unit 23 controls or executes driving assistance applications using proximity map data, which is map data on proximity of the subject vehicle, to function as an application executing unit along with the control circuit 2, which executes a navigation function. For instance, the application control unit 23 executes driving assistance applications including a brake (or stop) control, a speed control, a notice or an alarm relating to the foregoing, a headlight control, and an air-conditioner control.

The control circuit 2 functions as a map reliability degree computing unit for computing a map reliability degree R indicating an accuracy of map data (proximity map data) on proximity of the vehicle for executing a driving assistance application. A map reliability degree R is computed as follows. As a value becomes large, a reliability degree increases. As a value becomes small, a reliability degree decreases. Map Reliability Degree R=Positioning Accuracy Coefficient×Time-based Change Coefficient×Information Accuracy Coefficient The positioning accuracy coefficient indicates a positioning accuracy in map data for a target spot (i.e., a target facility or a target site). For instance, the positioning accuracy coefficient is an inverse number ($1/\Delta d$) of a positioning error $\Delta d$ of a position on map data relative to an absolute position. For instance, a positioning accuracy coefficient for a positioning error of 1 meter is one (1), while a positioning accuracy coefficient for a positioning error of 10 meters is one tenth (1/10).

The time-based change coefficient is an inverse number (1/f(t)) of a time-based change ratio f(t) that indicates a change after a time (t) elapses from the latest investigation for map data of a target spot. The time-based change ratio f(t) is a function of time and defined with respect to each of kinds k of target spots.

For instance, a kind-specific time-based change ratio fk(t) is relatively low in kinds such as an expressway and shrine, while a kind-specific time-based change ration fk(t) is relatively high in kinds such as a convenience store or gas station. Further, the time-based change coefficient varies depending on a repetition count of investigations (i.e., the number of investigations updating map data, or an investigations count); namely, a kind-specific time-based change ratio fk(t) is multiplied by a coefficient Sk (n). This increases the kind-specific time-based change ratio fk(t) as the number (n) of investigations increases.

Figures 4, 5:
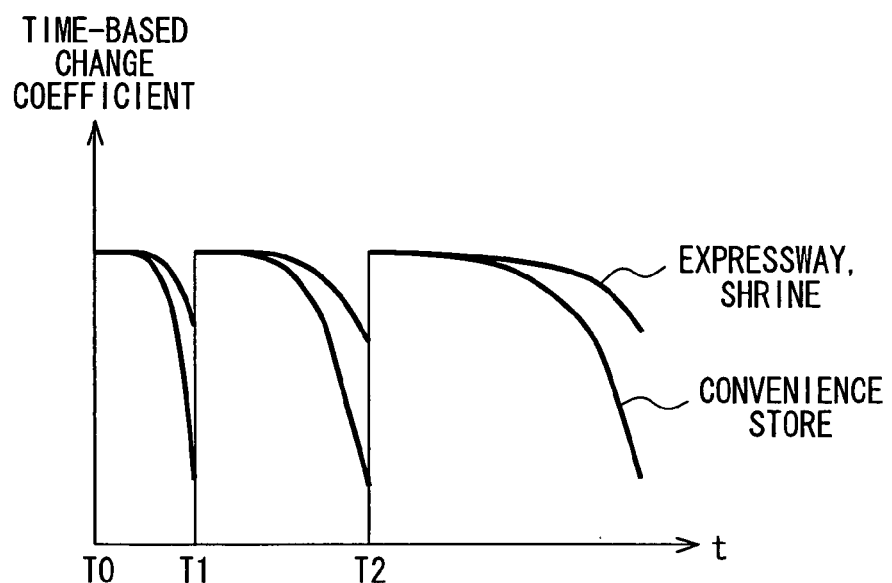
FIG. 4 is a diagram illustrating an example of using map data for a driving assistance application.
FIG. 5 is a diagram illustrating an example of a time-based change coefficient.

A relationship between a time elapse and a time-based change ratio is exemplified in FIG. 5. In FIG. 5, the y-axis (ordinate) indicates a time-based change coefficient (an inverse number of a time-based change ratio), while the x-axis (abscissa) indicates a time elapse. Each of T0, T1, and T2 indicates a time when a corresponding investigation was made. For instance, after approximately three months, the time-based change ratio fk(t) is still zero (0) % with respect to both the expressway (or shrine) and convenience store. After one year, the time-based change ratio fk(t) is five (5) % with respect to the expressway (or shrine) but twenty (20) % with respect to the convenience store.

Further, with respect to the convenience store, a kind-specific time-based change ratio fk(t)*Sk(1) after one year from the first investigation (T0) is 20%; a kind-specific time-based change ratio k(t)*Sk(2) after one year is 10% when no change is found at the second investigation (T1); and a kind-specific time-based change ratio k(t)*Sk(3) after one year is 5% when no change is found at the third investigation (T2). Thus, when no change is found at an investigation, i.e., a corresponding facility is continuously used or present, a time-based change coefficient gradually increases based on an investigations count (i.e., the number of investigations).

The information accuracy coefficient indicates, with respect to each of multiple information items pertinent to a target spot, an accordance ratio of map data relative to actual data. As explained above, data of the information accuracy coefficient is obtained via the communication device 20 from the outside information center 18. For instance, with respect to a kind k of a target spot, each information item i is indicated with an accordance ratio as to whether map data of the each information item 1 accords with actual data thereof. The information items include a shop name, pronunciation, phone number, address (prefecture, city, town, block number, etc.), kind (higher level classification, intermediate level classification, lower level classification, etc.), the number of parking lots, business hours, provided services, and credit cards available.

Here, the address or kind has a hierarchical structure, so the higher level information item is weighted to more significantly affect a reliability degree. Further, weighting of an information item is made depending on importance of the item. Thus, an information accuracy coefficient with respect to a kind k of a target spot is defined as $mk*\Sigma i*j/Ni$. Here, mk is a kind-specific coefficient; j is weighted value of an item i according; and Ni is the number of information items.

For instance, suppose the case where, with respect to a certain facility, the number of information items Ni is five (5), and three items of five items accord (i.e., map data of three items of five items accords with actual data of the three items of five items). In this case, the information accuracy coefficient is three thirds (3/5) when a weighted value of each item according is one (1). When four items accord, the information accuracy coefficient is four fifths (4/5). In contrast, suppose the case when weighted values to a name, a phone number, and others are one (1), two (2), and a half (0.5), respectively. In this case, when the number of items according is three and the items according include a name, but does not include an address, the information accuracy coefficient is two fifths (2/5). When the number of items according is three and the items according include a phone number, but does not include a name, the information accuracy coefficient is three fifths (3/5).

As another example with respect to a road section, suppose the case when six weighted values to a road shape, a road kind, a road distance, a road width, a road inclination, and a road name are four (4), one (1), three (3), one (1), two (2), and one (1), respectively. When all the items accord, the information accuracy coefficient is twelve/six (12/6=2). When only the road shape does not accord, the information accuracy coefficient is eight/six (8/6). When only the road name does not accord, the information accuracy coefficient is eleven/six (11/6).

Thus, a kind-specific map reliability degree Rk is represented as an equation (1):

$$Rk=(1/\Delta d)*\{1/(fk(t)*Sk(n))\}*(mk*\Sigma i*j/Ni) \qquad (1)$$

Once a map reliability degree R is computed, the control circuit 2 and application control unit 23 execute a certain operation corresponding to the computed map reliability degree R for each driving assistance application. In this case, a required positioning accuracy varies based on each driving assistance application or each operation of the each driving assistance application. For instance, a stop control requires a high positioning accuracy (i.e., a high map reliability degree). In contrast, rendering a map requires a relatively low positioning accuracy (i.e., a relatively low map reliability degree). An alarm of a speed regulation requires an intermediate level positioning accuracy (i.e., a high map reliability degree).

To that end, the control circuit 2 determines that map data is able to be used in a corresponding driving assistance application when a determination value of the product (Aj*Rk) of Aj and Rk is equal to or more than a predetermined value C. Here, Aj is a required accuracy, while Rk is a map reliability degree.

$$Rk*Aj \geq C \qquad (2)$$

Here, C is a constant for determination.

In other words, when a map reliability degree is high, a detail service such as a speed control or stop control can be executed. When low, a rough or broad service such as an alarm of speed, an alarm of stop, and a notice of stop position can be executed. Further, to effectively use the CPU, when a map reliability degree is higher and the vehicle is running, the control circuit 2 executes a map matching process more frequently. When the vehicle is stopping, the control circuit 2 executes a map matching process less frequently or does not execute a map matching process. When the map reliability degree is lower and the vehicle is running, the control circuit 2 executes a map matching process less frequently or increases an error range.

Figures 1, 3A:
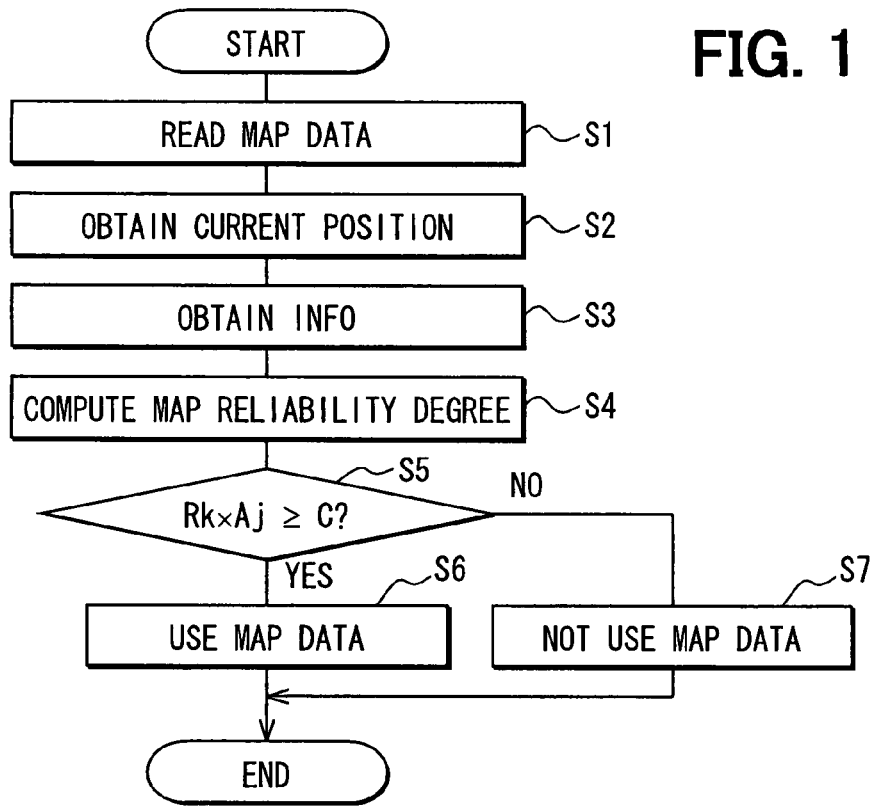

Next, operations under the above structure will be explained with reference to FIGS. 1, 3A, 3B, and 4. A flowchart in FIG. 1 illustrates a process for the control circuit 2 and application control unit 23 to determine whether map data on proximity of the subject vehicle can be used to execute a corresponding driving assistance application using the map data.

At Step S1, map data is read from the map database 8. At Step S2, a position detection process for detecting a vehicle current position is executed. In this position detection process, as explained above, an absolute position is first computed based on inputted signals from the sensors 3 to 6. A map matching process is made based on the computed absolute position, information on proximity from the camera 11 and radar 12, and road map data. Thus, a relative position of the subject vehicle on the map can be detected. At Step S3, information is obtained which is necessary for computing a map reliability degree for map data on proximity of the vehicle. The information includes data for an information accuracy obtained from the outside information center 18.

At Step S4, a map reliability degree is computed. The map reliability degree is computed based on the above equation (1). At Step S5, a determination as to use of a driving assistance application is made. This determination is made by determining whether the product of the required accuracy Aj and the computed map reliability degree Rk is equal to or more than a predetermined value C, as indicated in the equation (2). When the equation (2) is satisfied (Step S5: YES), a corresponding application or operation is executed by using the map data on proximity of the subject vehicle at Step S6. When the equation (2) is not satisfied (Step S5: NO), the map data on proximity of the subject vehicle is not used for the corresponding application or operation at Step S7.

One example is explained below. This example is applied to an application for using map data to render a map. This will be explained with reference to FIGS. 3A and 3B. In FIG. 3A, for simplifying explanation, a map reliability degree is indicated by only information on a positioning accuracy; namely, each of the time-based change coefficient and the information accuracy coefficient is assumed as one (1). For instance, the road map data include four map scales (1/500, 1/2,500, 1/10,000, and 1/100,000), which have positioning accuracies Δd of 0.5 m, 2.5 m, 10 m, and 100 m, respectively. In this case, map reliability degrees are 2, 0.4, 0.1, and 0.01, respectively.

When an application for displaying or rendering a map is executed, a required accuracy Aj varies depending on a map scale used for displaying the map, as shown in FIG. 3B. The required accuracies Aj are 0.5 m, 2.5 m. 10 m, and 100 m, with respect to the map scales of 1/500, 1/2,500, 1/10,000, and 1/100,000, respectively. Based on the map reliabilities in FIG. 3A and the required accuracies Aj, determination values identical to the left side (Rk*Aj) of the equation (2) are obtained as shown in FIG. 3B.

When the equation (2) is satisfied, the map data is determined to be used for the application for displaying a map. Suppose that the predetermined value C for determination is one (1). When a determination value (Rk*Aj) is equal to or more than one (1), a corresponding scale of map data can be used. For instance, when map data with a scale of 1/2,500 having a map reliability degree of 0.4 is used for displaying a map with a scale of 1/10,000, (Rk*Aj) is 40 (=0.4×100), which is more than one (1) to thereby allow rendering of a map satisfying the required accuracy Aj. For instance, when map data with a scale of 1/100,000 having a map reliability of 0.01 is used for displaying a map with a scale of 1/2,500, (Rk*Aj) is 0.025 (=0.01×2.5), which is less than one (1) to thereby disable rendering of a map satisfying the required accuracy Aj.

Another example of executing a driving assistance application will be explained with reference to FIG. 4. The map reliability degrees Rk are indicated similarly with FIG. 3A for simplifying explanation. In this case, operation items of the application require individually required accuracies Aj. For instance, a stop control requires a relatively high accuracy Aj of 0.5 m, while a notice of a speed regulation requires a relatively low accuracy Aj of 10 m.

With respect to a required accuracy Aj of 0.5 m, when the map reliability degree Rk is two (2) (at a scale of 1/500), (Rk*Aj) is one (1=0.5×2), which allows use of the map data. In contrast, when the map reliability degree Rk is 0.4 (at a scale of 1/2,500), (Rk*Aj) is 0.2 (=0.5×0.4), which disables use of the map data. However, when the determination value of (Rk*Aj) is less than one (1), an operation as a driving assistance application may be changed to a notice of a stop position or the like from a stop control. In contrast, with respect to a required accuracy Aj of 10 m, when the map reliability degree Rk is 0.1 (at a scale of 1/10,000 or more), (Rk*Aj) is one (1=10×0.1), which allows use of the map data for the corresponding application.

According to the example, when a driving assistance application is executed using map data on proximity of the subject vehicle, not a simple positioning accuracy but a concept of a map reliability degree indicating accuracies of various information items is introduced. The driving assistance application is executed as an operation item corresponding to the computed map reliability degree. When a map reliability degree is relatively low, a driving assistance application not requiring a relatively high map accuracy can be executed. When a map reliability degree is relatively high, even a driving assistance application requiring a relatively high map accuracy can be also executed.

Thus, a driving assistance application using map data on proximity of the subject vehicle can be stably executed. In this case, map data having a high accuracy in all the regions of a nation are not necessarily required. This alleviates necessity of increasing costs for maintaining map data and helps prevent a necessity of a significantly large volume of map data.

For instance, in this example, a (kind-specific) map reliability degree Rk is computed based on, with respect to a target spot, a target road, or the like, (i) positioning accuracy information indicating a positioning accuracy on the map data, (ii) time-based change information indicating a time-based change of the map data from the latest investigation, (iii) information accuracy indicating an accordance ratio of the map data relative to actual data. In detail, a map reliability degree Rk is multiplied by each of three coefficients of a positioning accuracy coefficient, a time-based change coefficient, and an information accuracy coefficient. Here, the positioning accuracy indicates a positioning accuracy on map data for a target spot or the like. The time-based change coefficient indicates information on a time-based change from the latest investigation for map data. The information accuracy coefficient indicates, with respect to multiple information items relating to a target spot or the like, an accordance ratio of map data relative to actual data. This increases a reliability of the map reliability degree Rk to thereby effectively use the map reliability degree Rk.

In the above example, a map display, a stop control, and a notice of a speed regulation are used as a driving assistance application; however, other applications such as a speed control, a headlight control to follow changes of road shapes, an air-conditioner control (automatic switching of internal air and external air) can be applied as a driving assistance application.

Further, a determination value is the product of (i) a required accuracy Aj designated to each driving assistance application and (ii) a map reliability degree Rk. The product as the determination value is compared with a predetermined value C to determine whether map data can be used or not. However, the computed map reliability degree Rk may be alternatively compared with a determination value, which is previously designated to each driving assistance application, to thereby determine whether map data can be used for executing a driving assistance application.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A driving assistance system for a vehicle, the system comprising:
    a map storage device for storing map data including information items relating to spots including at least one of a facility, a site, and a road;
    a current position detector for detecting a current position of the vehicle using the stored map data;
    an executing unit for executing a driving assistance application for a control target in the vehicle using map data on proximity of the detected current position of the vehicle; and
    a map reliability degree computing unit for computing a map reliability degree, which indicates an accuracy of the map data on proximity of the detected current position with respect to an information item relating to a spot included in the proximity, wherein
    the executing unit executes the driving assistance application based on an operation associated with the computed map reliability degree,
    the map reliability computing unit computes a map reliability degree based on, with respect to the spot, (i) positioning accuracy information indicating a positioning accuracy of the map data, (ii) time-based change information indicating a time-based change of the map data from a latest map update, (iii) information accuracy indicating an accordance ratio of the map data relative to actual data with respect to the information item.

2. The driving assistance system of claim 1, wherein
the positioning accuracy information is provided as an inverse number of a positioning error of a position on the map data relative to an absolute position.

3. The driving assistance system of claim 1, wherein
the time-based change information is provided as an inverse number of a time-based change ratio defined with respect to a kind of the spot and decreases as time elapses.

4. The driving assistance system of claim 3, wherein
the time-based change ratio varies depending on a repetition count with respect to a map update.

5. The driving assistance system of claim 1, wherein
data of the information accuracy is obtained from an outside information center via a communication device.

6. The driving assistance system of claim 1, wherein
the information items related to the spots are hierarchically provided from a higher level to a lower level, and a higher leveled information item is weighted to more significantly affect the map reliability degree.

7. The driving assistance system of claim 1, wherein
the map reliability degree is multiplied by a required accuracy designated to the driving assistance application to thereby obtain a product as a determination value, and the executing unit does not use the map data when the determination value is less than a predetermined value.

8. A method for executing a driving assistance application for a control target in a vehicle based on map data having information items relating to spots including at least one of a facility, a site, and a road, the method comprising:
    detecting a current position of the vehicle;
    computing a map reliability degree, which indicates an accuracy of map data on proximity of the detected current position of the vehicle with respect to an information item of a spot included in the proximity; and
    determining, based on the computed map reliability degree, whether the map data on proximity of the detected current position is allowed to be used for executing the driving assistance application, wherein
    the map reliability degree is computed based on, with respect to the spot, (i) positioning accuracy information indicating a positioning accuracy of the map data, (ii) time-based change information indicating a time-based change of the map data from a latest map update, (iii) information accuracy indicating an accordance ratio of the map data relative to actual data with respect to the information item.

* * * * *